United States Patent
Thompson et al.

(10) Patent No.: US 8,774,316 B2
(45) Date of Patent: Jul. 8, 2014

(54) TRANSMITTER INCLUDING CALIBRATION OF AN IN-PHASE/QUADRATURE (I/Q) MODULATOR AND ASSOCIATED METHODS

(75) Inventors: Mark W. Thompson, Fairport, NY (US); Robert E. Daminski, Rochester, NY (US); Brian C. Padalino, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 281 days.

(21) Appl. No.: 13/181,819

(22) Filed: Jul. 13, 2011

(65) Prior Publication Data

US 2013/0016794 A1    Jan. 17, 2013

(51) Int. Cl.
*H03C 3/00* (2006.01)

(52) U.S. Cl.
USPC .......... 375/302; 375/224; 375/296; 375/295; 455/114.1; 455/115.1; 455/126

(58) Field of Classification Search
USPC ........................................................ 375/302
See application file for complete search history.

(56) References Cited

U.S. PATENT DOCUMENTS

| | | | |
|---|---|---|---|
| 6,798,844 B2 | 9/2004 | Ratto | 375/29 |
| 7,092,454 B2 | 8/2006 | Dinur | 375/298 |
| 2005/0075815 A1 | 4/2005 | Webster et al. | |
| 2006/0133800 A1* | 6/2006 | Horii et al. | 396/529 |
| 2006/0252392 A1* | 11/2006 | Beamish et al. | 455/126 |
| 2007/0025433 A1* | 2/2007 | Hammerschmidt et al. | 375/224 |
| 2008/0166985 A1 | 7/2008 | Wortel et al. | |
| 2008/0273626 A1 | 11/2008 | Dorevitch et al. | |
| 2009/0267701 A1 | 10/2009 | Parsa et al. | |
| 2011/0019773 A1 | 1/2011 | Van De Beek et al. | |

FOREIGN PATENT DOCUMENTS

GB    2469076    10/2010

OTHER PUBLICATIONS

Cavers "*New Mehtods for Adaptiation of Quadrature Modulators and Demodulators in Amplifier Linearization Circuits*" IEEE Transactions on Vehicular Technology, vol. 46. No. 3, Aug. 1997.
Cavers et al. "*Adaptive Compensation for Imbalance and Offset Losses in Direct Conversion Transceivers*" IEEE Transactions on Vehicular Technology, vol. 42. No. 4, Nov. 1993.

* cited by examiner

*Primary Examiner* — Lihong Yu
(74) *Attorney, Agent, or Firm* — Allen, Dyer, Doppelt, Milbrath & Gilchrist, P.A.

(57) ABSTRACT

A transmitter includes an input, a modulator, and a calibration memory configured to store discrete calibration test points. A compensator is coupled between the input and the modulator and cooperates with the calibration memory to cause the modulator to generate a respective calibration carrier signal for each of the discrete calibration test points during a calibration phase. A detector is coupled to an output of the modulator and is configured to determine respective calibration values of the calibration carrier signals during the calibration phase. A compensator calculator is coupled to an output of the detector, and is configured to generate compensation values for the compensator for use during an operation phase and based on the calibration values of the calibration carrier signals.

19 Claims, 4 Drawing Sheets

US 8,774,316 B2

TRANSMITTER INCLUDING CALIBRATION OF AN IN-PHASE/QUADRATURE (I/Q) MODULATOR AND ASSOCIATED METHODS

FIELD OF THE INVENTION

The present invention relates to the field of wireless communications, and more particularly, to calibration of an analog in-phase/quadrature (I/Q) modulator for gain, phase and DC offset imperfections.

BACKGROUND OF THE INVENTION

Modulators are used within transmitters to modulate an input signal with a radio frequency (RF) signal. The modulated input signal may include voice and data, for example. One type of modulator is an in-phase/quadrature (I/Q) modulator. An I/Q modulator receives an in-phase (I) signal and a quadrature (Q) signal and modulates the I and Q signals with an RF signal.

An I/Q modulator is also known as a vector modulator, and is commonly used to support different types of modulation in a single package. Many transmitters rely on an analog implementation of an I/Q modulator. An analog I/Q modulator typically requires calibration whereas a digitally implemented I/Q modulator typically does not.

More particularly, an analog I/Q modulator suffers from imperfect carrier rejection 10 caused by DC offsets between signal paths, as illustrated in FIG. 1 for a single tone modulation. An analog I/Q modulator also suffers from imperfect sideband rejection 12 caused by gain and phase imbalance, as illustrated in FIG. 2 for a single tone modulation. These imperfections lead to gain, phase and DC offset imperfections which may degrade transmitter performance. Degraded transmitter performance includes reduced adjacent power rejection, FM distortion and AM ripple.

Imperfect carrier rejection and imperfect sideband rejection can be compensated manually or electronically. Single tone approaches may require feedback paths and analog-to-digital converters with sufficient speed to measure the feedback envelopes.

One calibration approach is disclosed in an article titled "Adaptive Compensation for Imbalance and Offset Losses in Direct Conversion Transceivers" by Cavers, IEEE Transactions on Vehicular Technology, Vol. 42, No, 4, November 1993, pp. 581-588. In a calibration phase, a continuous calibration tone is provided to the I/Q modulator for modulation, and an envelope detector receives the continuous modulated calibration tone. Sample points from the continuous modulated calibration tone are then converted from analog-to-digital for input to a calibration algorithm. A drawback of this approach is that the analog-to-digital converter as well as the feedback data needs to be fast enough to read the envelope data output from the modulator to measure the tone frequencies. This requirement results in increased cost and power consumption. Not only is proper timing alignment needed between the generated continuous calibration tone and the feedback envelope, but multiple analog-to-digital converters may be needed, which further results in increased cost and power consumption.

Another approach for calibrating an I/Q modulator in a transmitter is disclosed in U.S. Pat. No. 6,798,844. The transmitter includes an I/Q modulator and a compensator for correcting the phase and amplitude imbalance caused by the I/Q modulator. A feedback path samples the I/Q-modulated test signal to be transmitted, an analog-to-digital converter converts the signal samples taken from the test signal, a demodulator demodulates the signal samples digitally into in-phase and quadrature feedback signals, and an adapter determines the phase and amplitude imbalance caused by the I/Q modulator on the basis of the in-phase and quadrature feedback signals. The adapter then determines and provides to the compensator the correction parameters of phase and amplitude on the basis of the determined phase and amplitude imbalance.

Yet another approach to calibrate a modulator is disclosed in U.S. Pat. No. 7,092,454. Calibration parameters are provided to a calibration network so that the modulator receives a pair of predetermined sinusoidal in-phase and quadrature signals and outputs a distorted modulated signal. A processor then processes spectral parameters at first and second harmonics of a detected envelope signal of the distorted modulated signal to generate the calibration parameters for the calibration network.

A drawback of the approaches disclosed in the '844 and '454 patents is that they also require proper timing alignment between the generated calibration parameters and the feedback envelope, as well as requiring the calibration to be performed at sufficient speed to measure the feedback envelopes.

SUMMARY OF THE INVENTION

In view of the foregoing background, it is therefore an object of the present invention to simplify calibration of an I/Q modulator within a transmitter.

This and other objects, features, and advantages in accordance with the present invention are provided by a transmitter comprising an input, a modulator, a calibration memory configured to store a plurality of discrete calibration test points, and a compensator coupled between the input and the modulator and configured to cooperate with the calibration memory to cause the modulator to generate a respective calibration carrier signal for each of the discrete calibration test points during a calibration phase.

A detector may be coupled to an output of the modulator and configured to determine respective calibration values of the calibration carrier signals during the calibration phase. A compensator calculator may be coupled to an output of the detector and configured to generate compensation values for the compensator for use during an operation phase and based on the calibration values of the calibration carrier signals.

The modulator may be an analog I/Q modulator. An advantage of using stored discrete calibration test points for the analog I/Q modulator is that a continuous calibration tone is not required. This in turn allows the calibration phase to be performed at a slower rate of speed since proper timing alignment between the detector and the discrete test points is not required. In addition, the discrete calibration test points may be randomly applied to the compensator during the calibration phase.

The transmitter may further comprise an analog-to-digital converter between the detector and the compensator calculator. Another advantage of the calibration phase being able to be performed at a slower rate of speed is that a low performance analog-to-digital converter may be used. A low performance analog-to-digital converter is lower in cost and power consumption as compared to faster performing analog-to-digital converters needed for keeping up with continuous calibration test tones.

An interface between the analog-to-digital converter and the compensator calculator may be a serial interface. Another advantage of the calibration phase being able to be performed at a slower rate of speed is that a low throughput data bus may be used to provide the respective digitized calibration values of the calibration carrier signals to the compensator calculator. A serial interface thus reduces the interface burden between the analog-to-digital converter and the compensator calculator.

The compensator calculator may be configured to generate the compensation values via a series of iterative steps. The discrete calibration test points stored in the calibration memory may be used in a first iterative step and the compensation values generated in response thereto may then be used as the discrete calibration test points in a next iterative step, with the iteration repeating a set number of times. Alternatively, the iteration may repeat until changes in the compensation values become less than a set value.

The transmitter may further comprise a multiplexer between the input and the compensator, with the multiplexer being configured to be responsive to a control signal for providing the plurality of discrete calibration test points to the compensator during the calibration phase. The multiplexer may also provide in-phase and quadrature data from the input to the compensator for compensation during the operation phase. The detector may comprise an envelope detector, an RMS detector or a log detector, for example.

Another aspect of the invention is directed to a method for calibrating a modulator within a transmitter as described above. The method may comprise storing discrete calibration test points in a calibration memory. A compensator is coupled between an input and the modulator is operated to cooperate with the calibration memory to cause the modulator to generate a respective calibration carrier signal for each of the discrete calibration test points during a calibration phase. The method may further comprise operating a detector coupled to an output of the modulator to determine respective calibration values of the calibration carrier signals during the calibration phase. A compensator calculator coupled to an output of the detector may be operated to generate compensation values for the compensator for use during an operation phase and based on the calibration values of the calibration carrier signals.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
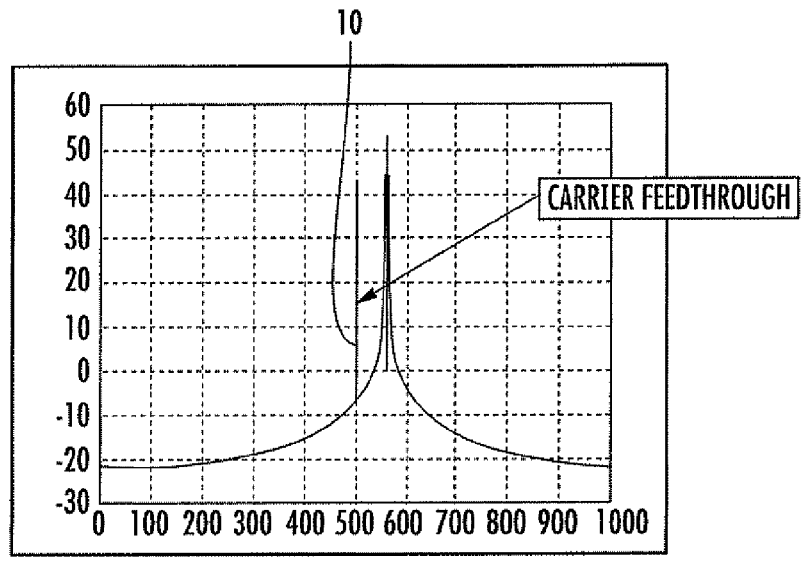
FIG. 1 is a graph illustrating the effects of DC offset for a single tone modulation in accordance with the prior art.
Figure 2:
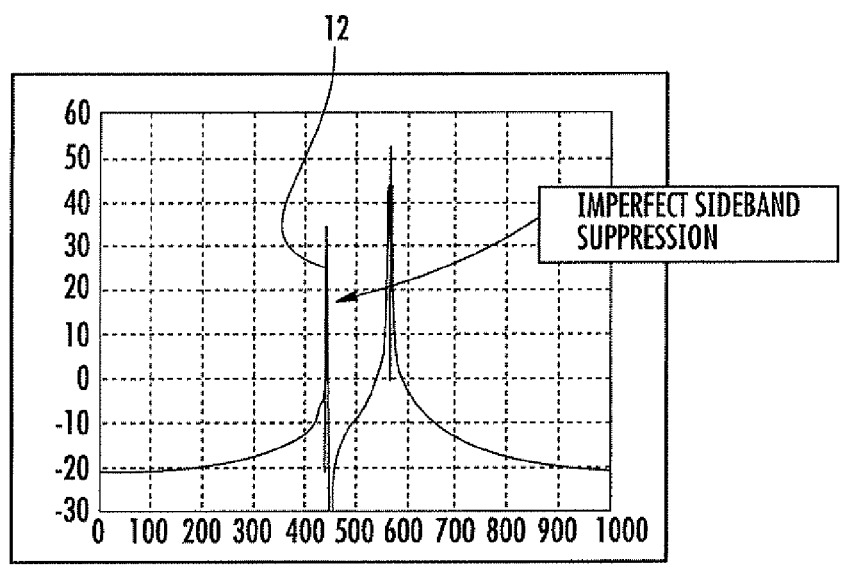
FIG. 2 is a graph illustrating the effects of gain and phase imbalance for a single tone modulation in accordance with the prior art.
Figure 3:
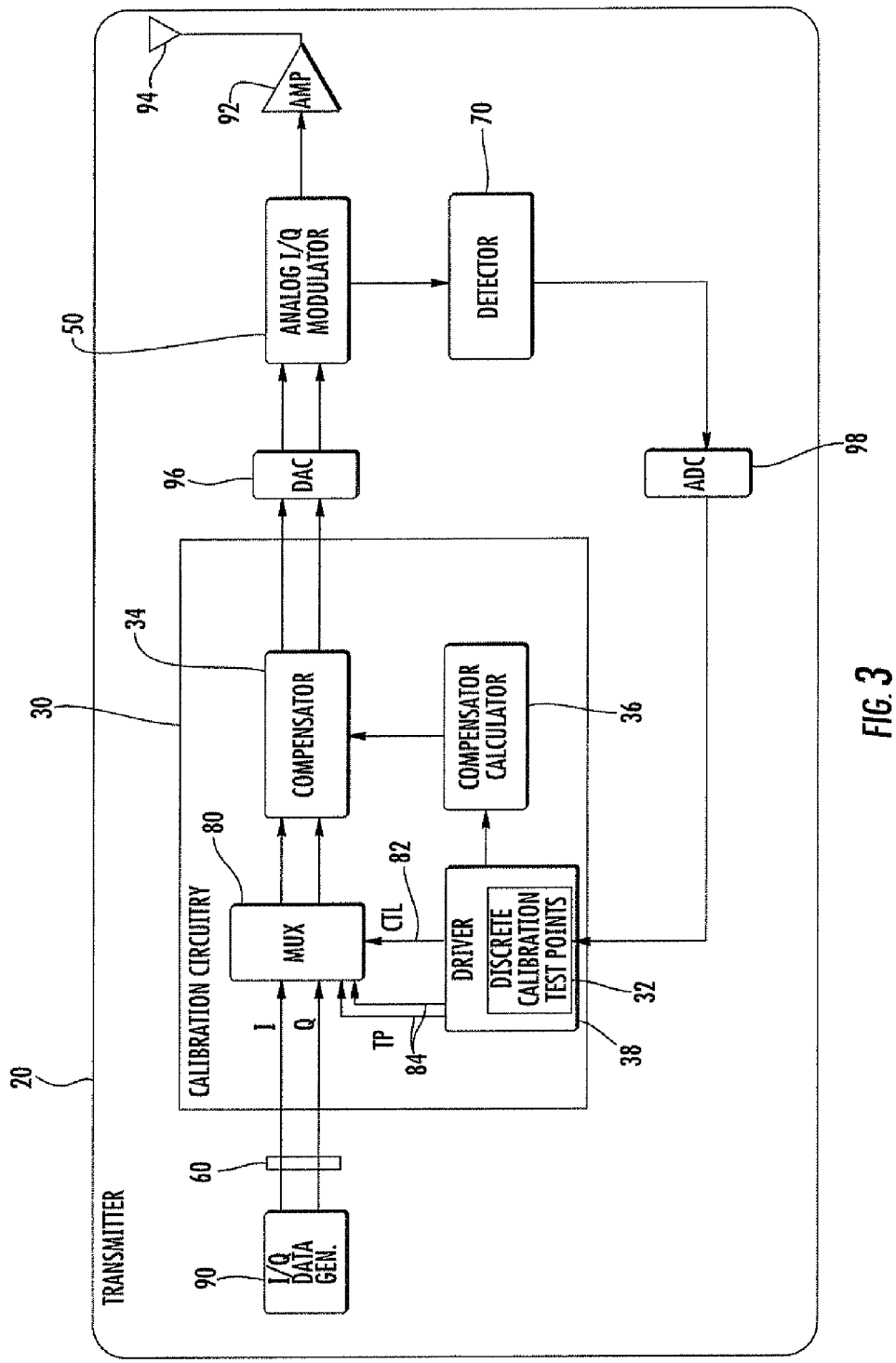
FIG. 3 is a block diagram of a transmitter that includes calibration circuitry for calibrating an I/Q modulator within the transmitter in accordance with the present invention.

Referring now to FIG. 3, a transmitter 20 including calibration circuitry 30 for calibrating an I/Q modulator 50 within the transmitter will now be described. The I/Q modulator 50 is illustratively an analog I/Q modulator. The calibration circuitry 30 includes a calibration memory 32 for storing discrete calibration test points, a compensator 34 and a compensator calculator 36.

The compensator 34 is coupled between an input 60 and the I/Q modulator 50, and cooperates with the calibration memory 32 to cause the I/Q modulator to generate a respective calibration carrier signal for each of the discrete calibration test points during a calibration phase.

A detector 70 is coupled to an output of the T/Q modulator 40 and is configured to determine respective calibration values of the calibration carrier signals during the calibration phase. The detector 70 may be configured as an envelope detector to determine calibration amplitudes of the calibration carrier signals. Alternatively, the detector 70 may be configured as a log detector or an RMS detector.

The compensator calculator 36 is coupled to an output of the detector 70 and is configured to generate compensation values for the compensator 34 for use during an operation phase and based on the calibration values of the calibration carrier signals.

The illustrated calibration memory 32 is included as part of a driver 38. Alternatively, the calibration memory 32 and driver 38 may be separate from one another. The driver 38 controls a multiplexer 80 positioned between the input 60 and the compensator 34. During the calibration phase, the driver 38 controls the multiplexer 80 via control line 82 so that the discrete calibration test points are input into the multiplexer via test point lines 84.

Once the I/Q modulator 50 has been calibrated, then the driver 38 controls the multiplexer 80 via control line 82 so that an I/Q data generator 90 provides I/Q data to be compensated prior to modulation by the I/Q modulator during the operation phase. The multiplexer 80 thus places the transmitter 20 in the calibration phase or the operation phase. During the operation phase, the modulated I/Q data is passed to an amplifier 92 and antenna 94 prior to be transmitted over the airwaves.

Figure 4:
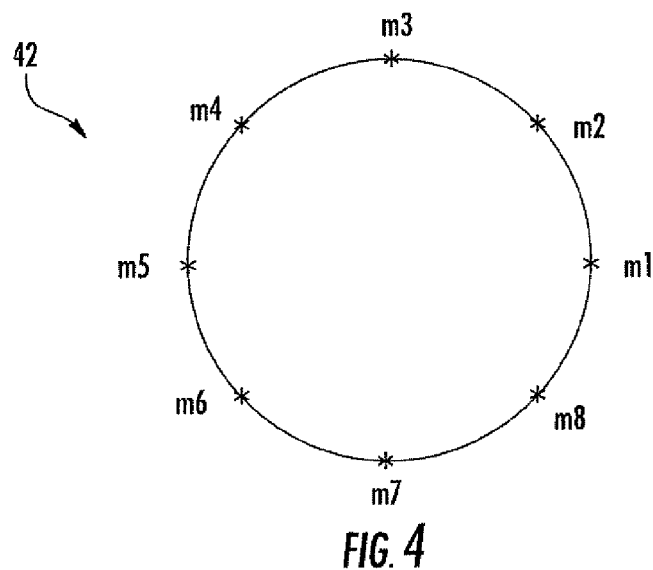
FIG. 4 is a unit circle plot of an I/Q constellation illustrating the discrete calibration test points stored in the calibration memory in accordance with the present invention.
Figure 5:
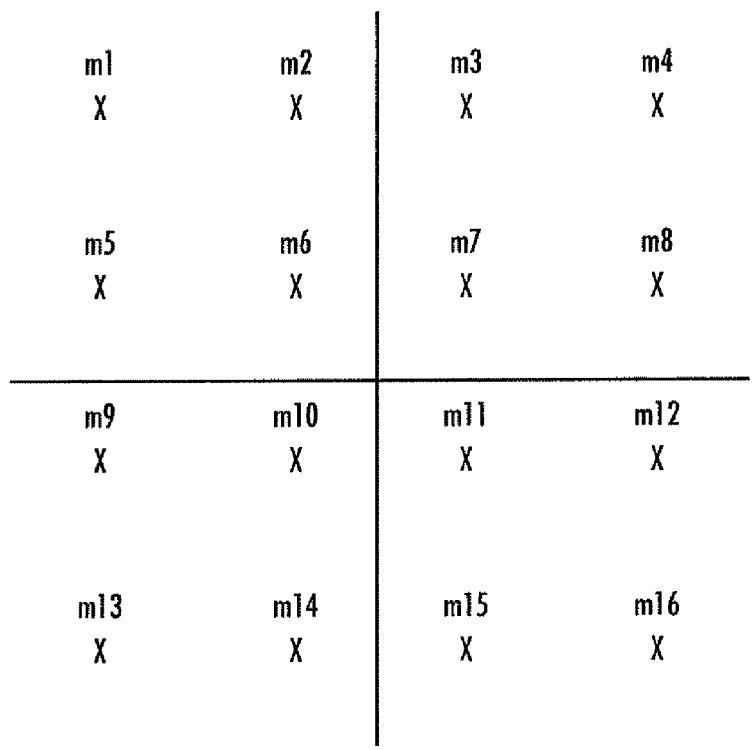
FIG. 5 is a QAM plot of an I/Q constellation illustrating the discrete calibration test points stored in the calibration memory in accordance with the present invention.
Figure 6:
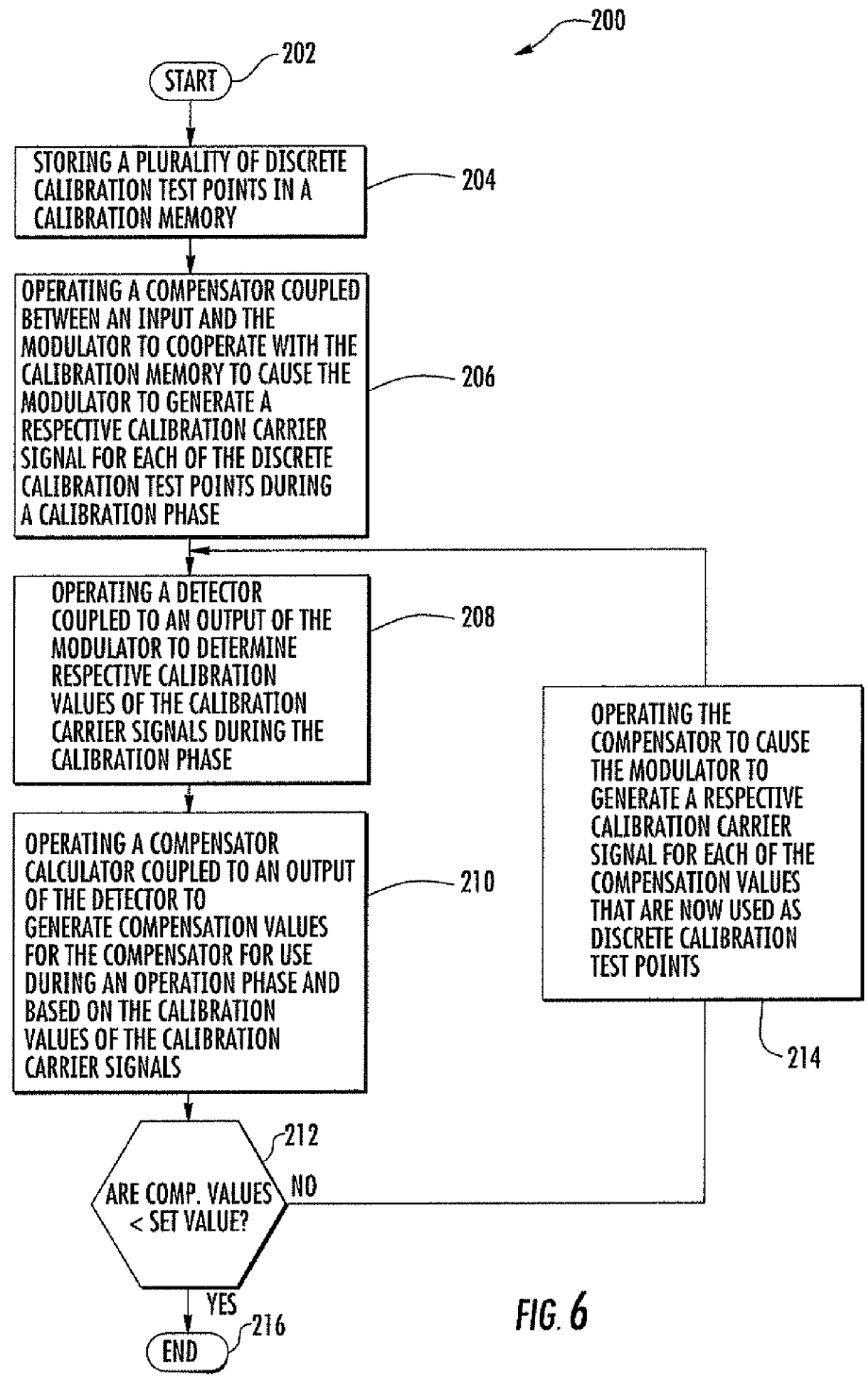
FIG. 6 is a block diagram illustrating a method for calibrating an I/Q modulator within a transmitter in accordance with the present invention.

For illustration purposes, 8 discrete calibration test points are stored in the calibration memory 32, as provided in TABLE 1. A plot or graph of an I/Q constellation 42 illustrating the 8 discrete calibration test points m1-m8 with respect to output of the detector 70 is provided in FIG. 4. As illustrated, the calibration test points m1-m8 are evenly spaced around the I/Q constellation 42. As readily appreciated by those skilled in the art, a different number of discrete calibration test points maybe stored. Alternatively, the calibration test points m1-m16 may be part of a 16-QAM constellation, as illustrated in FIG. 5. One of the important advantages is to avoid the need for a tone generator to generate a calibration test tone that would instead have to be used during the calibration test phase.

Since there is variation from modulator to modulator and across the RF frequency band, the compensation values as determined by the compensator calculator 36 for gain, phase and DC offsets are determined during operation of the transmitter 20. A digital-to-analog converter 96 converts the input to the I/Q modulator 50 to analog values, and an analog-to-digital converter 98 converts the output of the I/Q modulator

50 to digital values. The calibration circuitry 30 may be operated prior to keying the transmitter 20, for example. Since the calibration circuitry 30 can be operated at a relatively low rate of speed since discrete calibration test points are being used, the transmitter 20 may be perform other functions during the calibration process.

The compensation values are iteratively computed by the compensator calculator 36. The calibration process is initialized with the 8 discrete calibration test points. The calibration process is based on sampling the output of the detector 70 for eight different settings of the discrete calibration test points to the I/Q modulator 50. The eight discrete calibration test points m1-m8 are evenly spaced around the IQ constellation 42, as illustrated in FIG. 4, and are represented as the values.

TABLE 1

Relative IQ Test Points

| Test Point | I value | Q value | Detector Sample |
|---|---|---|---|
| 1 | 1 | 0 | $m_1$ |
| 2 | .707 | .707 | $m_2$ |
| 3 | 0 | 1 | $m_3$ |
| 4 | −.707 | .707 | $m_4$ |
| 5 | −1 | 0 | $m_5$ |
| 6 | −.707 | −.707 | $m_6$ |
| 7 | 0 | −1 | $m_7$ |
| 8 | .707 | −.707 | $m_8$ |

The calibration test points are relative values and do not represent the actual output voltages from the digital-to-analog converter 96. The actual output values are scaled and offset by a DC value in accordance with the operation of the I/Q modulator 50.

Prior to initialization of the calibration process, the compensation values are set to zero within the compensator calculator 36.

$$C_{gain}=0$$

$$C_{phase}=0$$

$$C_{I\_Offset}=0$$

$$C_{Q\_offset}=0$$

For each of the discrete calibration test points as provided in TABLE 1, the output of the detector 70 is read and saved. After all eight discrete calibration test points have been tested, four error estimates are computed by the compensator calculator 36 as shown below.

$$\mu_{gain} = \frac{m_1 - m_3 + m_5 - m_7}{2}$$

$$\mu_{phase} = \frac{m_2 - m_4 + m_6 - m_8}{2}$$

$$\mu_{I\_Offset} = \frac{m_1 - m_5 + .707*(m_2 - m_4 - m_6 + m_8)}{4}$$

$$\mu_{Q\_Offset} = \frac{m_3 - m_7 + .707*(m_2 + m_4 - m_6 - m_8)}{4}$$

Generally speaking, the above error estimates may be computed as follows for any set of N calibration points. The coefficients $c_{g,j}$, $c_{p,j}$, $c_{ioff,j}$, $c_{qoff,j}$ are sets of pre-computed coefficients that are a function of the set of N discrete calibration points.

$$\mu_{gain} = \sum_{j=1}^{N} m_j * c_{g,j}$$

$$\mu_{phase} = \sum_{j=1}^{N} m_j * c_{p,j}$$

$$\mu_{i\_offset} = \sum_{j=1}^{N} m_j * c_{ioff,j}$$

$$\mu_{q\_offset} = \sum_{j=1}^{N} m_j * c_{qoff,j}$$

The compensation values are updated by subtracting the error estimates computed above from the current compensation values.

$$C_{gain}=C_{gain}-K_{loop}\cdot\mu_{gain}$$

$$C_{phase}=C_{phase}-K_{loop}\cdot\mu_{phase}$$

$$C_{I\_Offset}=C_{I\_Offset}-K_{loop}\cdot\mu_{I\_Offset}$$

$$C_{Q\_Offset}=C_{Q\_Offset}-K_{loop}\cdot\mu_{Q\_Offset}$$

Where $C_{gain}$ is the gain compensation value, $C_{phase}$ is the phase compensation value, $C_{I\_Offset}$ is the baseband in-phase DC offset compensation value and $C_{Q\_Offset}$ is the baseband quadrature DC offset compensation value. The values $m_x$ are the measurements made for each of the respective discrete calibration test points from TABLE 1.

Each of these values are to be scaled by a gain value, $K_{loop}$ that represents the loop gain of a closed loop system. This scaling value depends on the particular components of the calibration circuitry and analog I/Q modulator, as readily understood by those skilled in the art.

The I and Q values are adjusted by the compensator 34 based on the compensation calculator 36 modifying the value (e.g., amplitude) of each path, adjusting the phase of each path by cross coupling between the paths and then finally a constant is added. The adjustments or updated compensation values to the and Q values are shown in the equations below.

$$\alpha = 1 + \frac{C_{gain}}{2}$$

$$\beta = 1 - \frac{C_{gain}}{2}$$

$$I_{comp} = \alpha \cdot I_{bb} + \frac{C_{phase}}{2} \cdot Q_{bb} + C_{I\_Offset}$$

$$Q_{comp} = \beta \cdot Q_{bb} + \frac{C_{phase}}{2} \cdot I_{bb} + C_{Q\_Offset}$$

$I_{bb}$ and $Q_{bb}$ are the uncompensated baseband I and Q values and $I_{comp}$ and $Q_{comp}$ are the compensated I and Q values that are written to the digital-to-analog converter 96 driving the analog I/Q modulator 50. The new compensated I and Q values are computed and used as the test points in the next iteration. Measurements are made again and the compensation values are re-computed. The calibration process iterates for either a set number of times or until the changes in the compensation values become smaller than a set value.

As noted above, the compensator calculator 36 generates the compensation values via a series of iterative steps. The discrete calibration test points stored in the calibration memory 32 are thus used in a first iterative step and the compensation values generated in response thereto are then be used as the discrete calibration test points in a next iterative step.

Another aspect of the invention is directed to a method for calibrating a modulator 50 within a transmitter 20 as described above. Referring now to the flowchart 200 in FIG. 5, from the start (Block 202), the method comprises storing discrete calibration test points in a calibration memory 32 at Block 204. A compensator 34 is coupled between an input 60 and the modulator 50 is operated at Block 206 to cooperate with the calibration memory 32 to cause the modulator to generate a respective calibration carrier signal for each of the discrete calibration test points during a calibration phase.

The method further comprises operating a detector 70 coupled to an output of the modulator 50 to determine respective calibration values (e.g., amplitudes) of the calibration carrier signals during the calibration phase at Block 208. A compensator calculator 36 coupled to an output of the detector 70 is operated at Block 210 to generate compensation values for the compensator for use during an operation phase and based on the calibration values of the calibration carrier signals.

As noted above, the compensator calculator 36 is configured to generate the compensation values via a series of iterative steps. A determination is made at decision Block 212 based on the generated compensation values from Block 210. If the generated compensation values are less than a predetermined value, then the process loops to Block 214 so that the compensator 34 generates a respective carrier signal for each of the compensation values that are now used as discrete calibration test points.

In other words, the discrete calibration test points stored in the calibration memory 32 are used in a first iteration, and the compensation values generated in response thereto are used as the discrete calibration test points in a next iteration. The iteration repeats until changes in the compensation values become less than a set value. Alternative, the iteration may repeat a set number of times. The method ends at Block 216.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A transmitter comprising:
an input;
a multiplexer coupled to said input;
a modulator;
a calibration memory configured to store a plurality of discrete calibration test points;
a compensator coupled between said multiplexer and said modulator and configured to cooperate with said calibration memory to cause said modulator to generate a respective calibration carrier signal for each of the discrete calibration test points during a calibration phase, with said compensator randomly uses the plurality of discrete calibration test points during the calibration phase;
a detector coupled to said modulator and configured to determine respective calibration values of the calibration carrier signals during the calibration phase; and
a compensator calculator coupled to said detector and configured to generate compensation values for said compensator for use during an operation phase and based on the calibration values of the calibration carrier signals;
said multiplexer being configured to be responsive to a control signal for providing the plurality of discrete calibration test points to said compensator during the calibration phase, and providing in-phase and quadrature data from said input to said compensator for compensation during the operation phase.

2. The transmitter according to claim 1 wherein said modulator comprises an analog in-phase/quadrature (I/Q) modulator.

3. The transmitter according to claim 1 further comprising:
an analog-to-digital converter coupled to said detector; and
a serial interface between said analog-to-digital converter and said calibration memory.

4. The transmitter according to claim 1 wherein said compensator calculator is configured to generate the compensation values via a series of iterative steps.

5. The transmitter according to claim 4 wherein the plurality of discrete calibration test points is used in a first iterative step and the compensation values generated in response thereto are used as the plurality of discrete calibration test points in a next iterative step, with the iteration repeating a set number of times.

6. The transmitter according to claim 4 wherein the plurality of discrete calibration test points is used in a first iterative step and the compensation values generated in response thereto are used as the plurality of discrete calibration test points in a next iterative step, with the iteration repeating until changes in the compensation values become less than a set value.

7. The transmitter according to claim 1 further comprising a digital-to-analog converter coupled between said compensator and said modulator.

8. The transmitter according to claim 1 wherein said detector comprises at least one of an envelope detector, an RMS detector and a log detector.

9. A transmitter comprising:
an input;
a multiplexer coupled to said input;
an in-phase and quadrature (I/Q) modulator;
a calibration memory configured to store a plurality of discrete calibration test points;
a compensator coupled between said multiplexer and said I/Q modulator and configured to cooperate with said calibration memory to cause said I/Q modulator to generate a respective calibration carrier signal for each of the discrete calibration test points during a calibration phase, with said compensator randomly uses the plurality of discrete calibration test points during the calibration phase;
a detector coupled to said I/Q modulator and configured to determine respective calibration values of the calibration carrier signals during the calibration phase;
an analog-to-digital converter coupled to said detector;
a serial interface between said analog-to-digital converter and said calibration memory; and
a compensator calculator coupled to said serial interface and configured to generate compensation values for said compensator for use during an operation phase and based on the calibration values of the calibration carrier signals;
said multiplexer being configured to be responsive to a control signal for providing the plurality of discrete calibration test points to said compensator during the calibration phase, and providing in-phase and quadrature data from said input to said compensator for compensation during the operation phase.

10. The transmitter according to claim 9 wherein said compensator calculator is configured to generate the compensation values via a series of iterative steps.

11. The transmitter according to claim 10 wherein the plurality of discrete calibration test points is used in a first iterative step and the compensation values generated in response thereto are used as the plurality of discrete calibration test points in a next iterative step, with the iteration repeating a set number of times.

12. The transmitter according to claim 10 wherein the plurality of discrete calibration test points is used in a first iterative step and the compensation values generated in response thereto are used as the plurality of discrete calibration test points in a next iterative step, with the iteration repeating until changes in the compensation values become less than a set value.

13. A method for calibrating a modulator within a transmitter comprising:
 storing a plurality of discrete calibration test points in a calibration memory;
 coupling a multiplexer to an input;
 operating a compensator coupled between the multiplexer and the modulator to cooperate with the calibration memory to cause the modulator to generate a respective calibration carrier signal for each of the discrete calibration test points during a calibration phase, with the compensator randomly uses the plurality of discrete calibration test points during the calibration phase;
 operating a detector coupled to an output of the modulator to determine respective calibration values of the calibration carrier signals during the calibration phase; and
 operating a compensator calculator coupled to an output of the detector to generate compensation values for the compensator for use during an operation phase and based on the calibration values of the calibration carrier signals.
 operating the multiplexer based on a control signal for providing the plurality of discrete calibration test points to the compensator during the calibration phase, and providing in-phase and quadrature data from the input to the compensator for compensation during the operation phase.

14. The method according to claim 13 wherein the modulator comprises an analog in-phase/quadrature (I/Q) modulator.

15. The method according to claim 13 wherein the transmitter further comprises an analog-to-digital converter coupled to the detector, and a serial interface between the analog-to-digital converter and the calibration memory.

16. The method according to claim 13 wherein the compensator calculator is configured to generate the compensation values via a series of iterative steps.

17. The method according to claim 16 wherein the plurality of discrete calibration test points is used in a first iterative step and the compensation values generated in response thereto are used as the plurality of discrete calibration test points in a next iterative step, with the iteration repeating a set number of times.

18. The method according to claim 16 wherein the plurality of discrete calibration test points is used in a first iterative step and the compensation values generated in response thereto are used as the plurality of discrete calibration test points in a next iterative step, with the iteration repeating a until changes in the compensation values become less than a set value.

19. The method according to claim 13 wherein the detector comprises at least one of an envelope detector, an RMS detector and a log detector.

* * * * *